United States Patent [19]

Sugata et al.

[11] Patent Number: 4,798,694
[45] Date of Patent: Jan. 17, 1989

[54] METHOD FOR PRODUCING COMPOSITE MATERIALS

[75] Inventors: Hiroyuki Sugata, Atsugi; Kouhei Nakata, Yokohama; Nobutoshi Mizusawa, Sagamihara; Satoshi Yuasa, Yokohama; Masahiro Haruta, Tokyo; Takashi Hamamoto, Yokohama; Kuniji Osabe, Tama, all of Japan

[73] Assignee: Canon Kabushiki Kaisha, Tokyo, Japan

[21] Appl. No.: 893,815

[22] Filed: Aug. 6, 1986

[30] Foreign Application Priority Data

| Aug. 9, 1985 | [JP] | Japan | 60-174283 |
| Aug. 9, 1985 | [JP] | Japan | 60-174285 |
| Aug. 9, 1985 | [JP] | Japan | 60-174286 |
| Aug. 9, 1985 | [JP] | Japan | 60-174287 |
| Aug. 26, 1985 | [JP] | Japan | 60-185767 |
| Aug. 26, 1985 | [JP] | Japan | 60-185768 |
| Aug. 26, 1985 | [JP] | Japan | 60-185769 |
| Aug. 26, 1985 | [JP] | Japan | 60-185770 |
| Sep. 25, 1985 | [JP] | Japan | 60-210283 |
| Sep. 25, 1985 | [JP] | Japan | 60-210284 |
| Sep. 25, 1985 | [JP] | Japan | 60-210285 |
| Sep. 25, 1985 | [JP] | Japan | 60-210286 |

[51] Int. Cl.$^4$ .......................... B28B 1/28; B29B 7/30; B29C 41/04; B29C 41/22

[52] U.S. Cl. .................... 264/60; 264/86; 264/87; 264/113; 264/114; 264/311; 264/349; 419/2; 419/6; 419/40; 419/66

[58] Field of Search .............. 264/1.7, 2.1, 86, 87, 264/56, 60, 311, 42, 43, 113, 114, 349; 419/2, 6, 40, 66

[56] References Cited

U.S. PATENT DOCUMENTS

| 2,962,762 | 12/1960 | Hartmann et al. | 264/87 |
| 3,256,373 | 6/1966 | Horst | 264/2.1 |
| 3,594,273 | 7/1971 | Williams | 264/87 |
| 3,651,855 | 3/1972 | Daussan | 264/87 |
| 3,736,159 | 5/1973 | Gibson et al. | 264/87 |
| 3,917,778 | 11/1975 | Shiraki et al. | 264/86 |
| 4,022,855 | 5/1977 | Hamblen | 264/2.1 |
| 4,204,907 | 5/1980 | Korklan et al. | 264/87 |
| 4,414,164 | 11/1983 | Roba et al. | 264/2.1 |

Primary Examiner—James Lowe
Attorney, Agent, or Firm—Fitzpatrick, Cella, Harper & Scinto

[57] ABSTRACT

A molded composite material comprising a plural number of constituents is provided in which at least two of the constituents are distributed with a relative existing ratio varying at least in one direction in the composite material. A process for producing the composite material is also provided.

14 Claims, 8 Drawing Sheets

METHOD FOR PRODUCING COMPOSITE MATERIALS

BACKGROUND OF THE INVENTION

1. Field of the Invention

This invention relates to a composite material, particularly a composite material having a novel construction (composition) capable of exhibiting composite functions useful in various industrial fields, and to a method for producing the same.

2. Related Background Art

In the prior art, molded products constituted of a single material can exhibit only the performances inherent in the material employed, and therefore, in order to impart another additional function to those molded products, composite materials combined with other components have been widely used. Typical examples may include composite organic materials such as various colored plastic moldings, various electroconductive plastic moldings, various filler-compounded plastic moldings, etc., composite organic materials such as various special glasses, various ceramics, various alloy materials, various catalysts, etc., and their kinds may be said to be innumerable. Such various kinds of composite materials of the prior art are applied with various contrivances so that the components constituting the composite materials may be uniformly compounded with each other. In the case of forming both components in layers, the molded products formed from the respective materials have been subjected to such means as lamination, fusion, adhesion, etc., to accomplish composite formation.

Various kinds of composite materials of the prior art as mentioned above may be roughly classified into uniform composite materials in which the constituents exist uniformly with each other (e.g. molded product containing electroconductive particles uniformly dispersed in a plastic base) and laminated products in which the constituents are bonded in layers (e.g. vapor-deposited molded product having a metal vapor-deposited thereon). In addition to these composite materials known in the art, it has been also widely desired in various industrial fields to have, for example, a composite material in which its magnetic intensity is varied in at least one direction of the molded product in specific magnetic materials, a composite material in which its electroconductivity is varied in at least one direction of the molded product in electroconductive materials, a composite material in which thermal conductivity is varied in at least one direction in thermal conductive materials, a composite material in which photoconductivity is varied in photoconductive materials, or a material in which these properties are further combined.

In this connection, as the typical method for producing composite optical materials having refractive index distribution, the following methods (1), and (2) have been known in the art.

(1) The so-called ion exchange method in which ions in glass are exchanged with other ions; and (2) The gas phase synthetic method.

The above ion exchange method involves the essential restriction that ion exchange shall be carried out under the temperature condition at which the glass itself will not be deformed. More specifically, for carrying out ion exchange within practical time, only monovalent cations such as $Tl^+$, $Cs^+$, $Rb^+$, etc., with rapid diffusion speed can be used as the diffusing species. Particularly, when a large refractive index distribution is desired to be obtained, $Tl^+$ ions are required to be used. However, in this case, it cannot be avoided that the dependency of refractive index on wavelength becomes greater. Also, even when a monovalent cation with greater diffusion speed as mentioned above is used, if a thick rod lens with a diameter of 20 mm or longer is to be prepared by the method applying ion exchange, the required time becomes so long that it cannot be industrially practiced.

On the other hand, as the gas phase synthetic method, VAD (Vapour-Axis Deposition) method and CVD (Chemical Vapour Deposition) method have been known. However, these methods are low in productivity and no large optical element can be obtained with ease.

As described above, under the present state of the art, there is no method for easily producing a high quality composite material having desired composite functions, and there has been known substantially no composite material of high performance which is practical in industry and of low price.

SUMMARY OF THE INVENTION

Accordingly; a first object of the present invention is to provide a composite material in which various physical properties or functions as mentioned above are varied within said material in at least one direction thereof.

A second object of the present invention is to provide a novel method for producing the above composite material under the state of high quality and high performance with ease.

According to an aspect of the present invention, there is provided a molded composite material comprising a plural number of constituents, the relative existing ratio of at least two kinds of said constituents being varied in at least one direction of said composite material.

According to another aspect of the present invention, there is provided a process for producing a composite material comprising depositing continuously a mixture of a plural number of constituents while varying the mixing ratio thereof with time and molding said mixture while varying continuously the relative existing ratio of at least two kinds of said constituents in the direction of said deposition.

According to a further aspect of the present invention, there is provided a process for producing a composite material with a plural number of constituents, comprising mixing said constituents with a mixing ratio of said constituents varying with time and feeding the mixture of the constituents into a rotating molding vessel to mold said mixture therein.

According to a still further aspect of the present invention, there is provided a process for producing a composite material with the use of a plural number of constituents, comprising a step of molding a mixture of said constituents with a mixing ratio thereof varying with time and a step of treating the molded product.

DETAILED DESCRIPTION OF THE PREFERRED EMBODIMENTS

The present inventors have made comprehensive studies in order to obtain a composite material which is varied in physical properties or functions in at least one direction by solving the problems of the prior art as described above, and consequently found that a variety of composite materials which have overcome the above problems of the prior art can be obtained easily and inexpensively by varying the mixing ratio of a plural number of constituents having different physical properties with lapse of time and carrying out molding of the mixture with the distribution of the relative existing ratio as reflected by the mixing ratio of the constituents being fixed.

More specifically, the present invention is a composite material formed of a plural number of constituents, in which the relative existing ratio of at least two kinds of the above constituents is varied in at least one direction of said composite material. To describe in detail about the present invention, the constitution of the composite material of the present invention is characterized, as illustrated in FIG. 1A and FIG. 1B, in that at least one component constituting the composite material is varied in an existing ratio relative to the other constituent in at least one direction of said composite material.

Figure 1A:
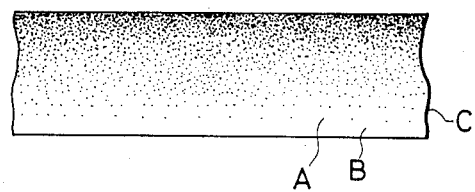
FIG. 1A and FIG. 1B are schematic illustrations which illustrate schematically the constitution of the composite material of the present invention.
Figure 1B:
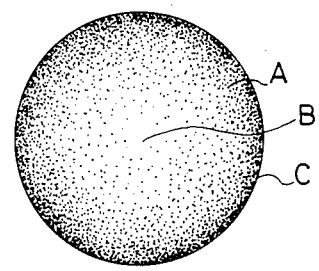

For example, as illustrated in FIG. 1A and FIG. 1B, in the composite material molded product C comprising a component A and a matrix B, the concentration of the component A is increased toward the thickness direction, length direction or the centripetal direction or the outer side direction of the molded product, and the component A constitutes 100% of the molded product C at one end or the outer side thereof, while no component A exists on the other end or the center, with the concentration of the component A being increased or reduced in proportion to the distance from the end or the center in the intermediate region.

The above example is a typical example to make the present invention readily understandable, and the composite material of the present invention is not limited in shape, but it may be a planar molded product such as plate, sheet, film, etc., or alternatively three-dimensional molded product such as column, cylinder, disc, prism, pyramid, etc., also, their constituents are not limited in form, but may include various forms such as particles, molecules, etc.

In the example shown in the drawing, in a specific matrix, a component A different from said matrix is dispersed therein, but the components constituting the molded product are not limited to the above examples, provided that they are components capable of taking some form finally. For example, it may be a material containing two or more kinds of components dispersed or dissolved in a specific matrix or alternatively two or more different kinds of the components may be mixed with each other as powders, etc. Thus, the components constituting the composite material are not limited in form, number or kind.

As to the physical properties of the material, any of industrially useful physical properties may be included, such as electroconductivity, magnetic force, magnetic property, thermal conductivity, photoconductivity, hardness, light absorbancy, reflectivity, heat absorbancy, sound absorbancy, gas absorbancy, hue, thermal softening property, refractive index, specific gravity, mechanical strength, heat resistance, corrosion resistance, chemical resistance, etc.

The change in existing position or relative existing ratio of the components constituting the composite material of the present invention relative to the distance is not required to be linear, but it may be changed in any desired manner provided that there is change in existing ratio. For example, it may be a distribution such that a specific component is higher in concentration near the center portion, being lower in concentration toward the peripheral portion or vice versa, or alternatively such that a specific component is changed according to any kind of curve such as parabolic curve, secondary curve, wavy curve from one end of the molded product toward the other. Any of such changes in existing ratio can be accomplished easily by the present invention as described below.

Next, the methods for providing the composite materials of the present invention as described above are explained in detail by referring to FIGS. 2-16 which illustrate the preferred embodiments of the method of the present invention.

(Embodiment 1)

Preparation example of a composite material in which the constituents are varied in the thickness direction by use of particle dispersions.

For convenience of explanation, description is made by referring to an embodiment as the most readily understandable example, in which two kinds of particles different from each other are formed into two kinds of dispersions dispersed in any desired liquid medium, and the siphon system utilizing merely the gravitational force is employed as the simplest feeding method.

Figure 2:
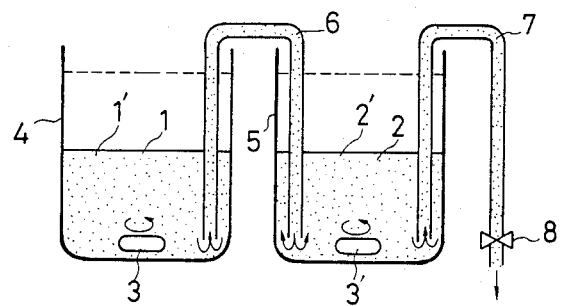
FIG. 2 and FIG. 3, FIG. 6 to FIG. 15 are each schematic sectional views of the device according to the example of the production method of the present invention.

FIG. 2 shows one preferable example of the method for mixing the dispersions containing the two kinds of the particles while varying its mixing ratio and feeding the mixture into a molding equipment, and 1 in the figure represents specific particles existing within the vessel 4 and 2 represents the other particles existing within the vessel 5 which are different from the above particles 1, and 3, 3' represent stirring means.

The stirring means 3 within the vessel 4 is placed to ensure uniform dispersion of the particles 1, but no such means is required if the particles are stable in dispersed state.

Figure 3:
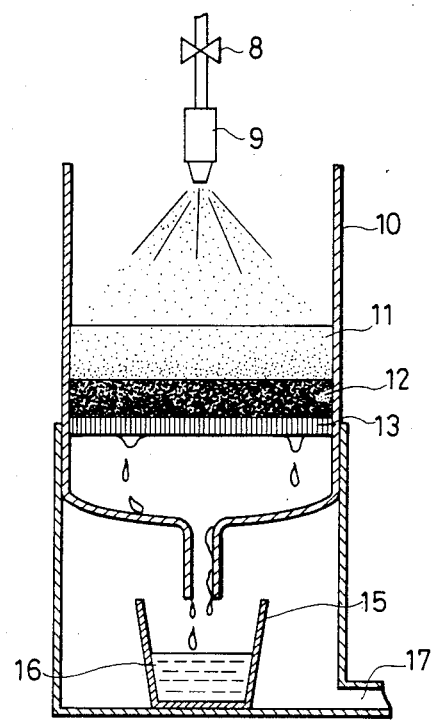

On the other hand, 6 is a means for feeding a dispersion 1' containing the particles 1 into the vessel 5, 7 is a feeding channel for feeding the mixed dispersion into the molding equipment 10 as exemplified in FIG. 3, 8 is a means such as a cock for controlling the opening of the feeding channel 7 and the feeding rate of the mixed dispersion, and 9 is a means for feeding uniformly the mixed dispersion into the forming device 9.

With the feeding channels 6 and 7 being filled with dispersions 1' and 2' excluding the air internally contained, the cock 8 is opened so that an appropriate flow rate may be obtained.

At the tip of the feeding channel 7, an ejecting device 9 having a nozzle, etc., is provided to eject the mixed dispersion which flows out. As the dispersion 2' is ejected, the dispersion 1' flows into the vessel 5 through the feeding channel 6 so that the levels in the vessels 4 and 5 may become the same and the dispersion 1' and the dispersion 2' are uniformly mixed by means of a stirring means 3' within the vessel 5.

Figure 4:
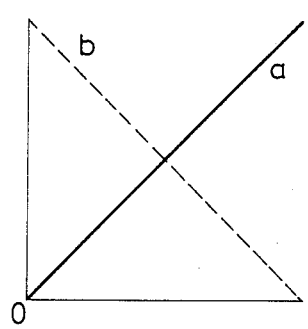
FIG. 4 and FIG. 5 are each graphs for explanation of one example of the present invention.

Thus, with the increase of the cumulative outflow amount of the mixed dispersions, for example as shown in FIG. 4, the mixing ratio of the particles within the vessel 5 is increased as shown by the solid line a. On the other hand, the mixing ratio of the particles 2 is lowered as shown by the broken line b. In FIG. 4, the abscissa indicates the cumulative amounts of the mixture discharged, and the ordinate indicates the existing ratio of the components in the particulate mixture.

The mixed dispersion ejected from the ejecting device 9 is deposited on, for example, a filter 13 in a cylindrical molding equipment 10 as shown in FIG. 3. The liquid 16 which is the dispersing medium passes through the filter 13 and is pooled in the tank 15 below the filter. The mixed particles remaining on the filter 13 form a deposited layer, namely a molded product 12. The mixed dispersion ejected from the ejecting device 9 falls on the deposited layer 12, forming first a mixed dispersion layer 11, but it is preferable to control the feeding amount of the mixed dispersion and filtration speed so that no such layer may be formed or such a layer may be made as thin as possible.

In the molded product 12 thus produced, the mixing ratio of the particles 1 is increased from the bottom to the upper face in the thickness direction. The existing ratio of particles 1 and particles 2 in the molded product 12 is varied as shown in FIG. 4. In FIG. 4, in this case, the abscissa indicates the distance from the filter 13, the ordinate the existing ratio of the particles 1 and particles 2, the broken line b the existing ratio of particles 2 and the solid line a the existing ratio of particles 1.

In the method as described above, a preferable method of mixing the particles employed is shown by way of example, but it is also possible to utilize any other method, so long as the mixing ratio of two or more kinds of particles can be varied and the present invention is not limited only to the method as exemplified above.

Figure 6:
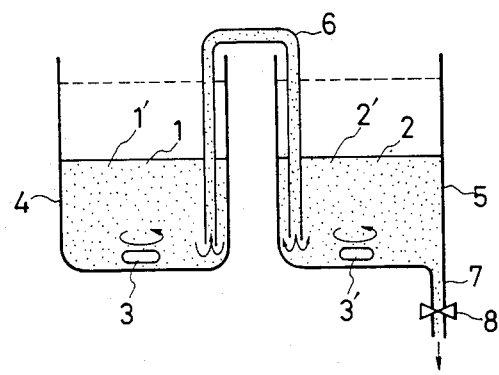
Figure 7:
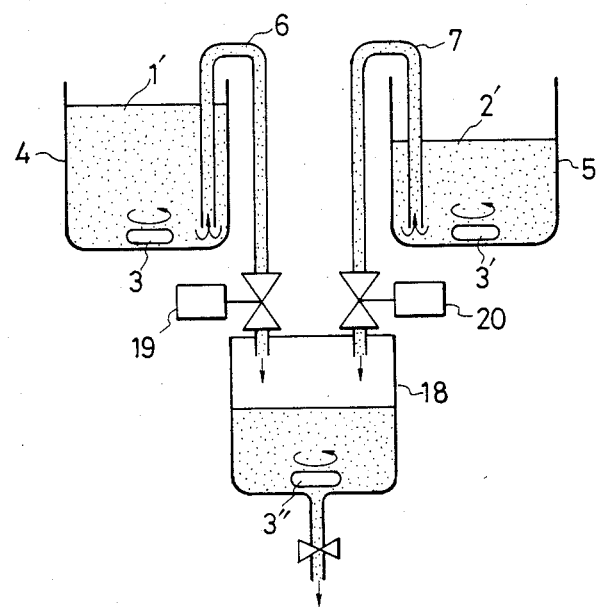

For example, in the method of FIG. 2, the feeding channels 6 and 7 may be preferably made to have volumes as small as possible, and therefore it is also effective to provide the feeding channel 7 at the bottom of the vessel 5 as shown in FIG. 6. Also, although the vessels 4 and 5 in FIG. 2 are made in the above example to have the same volumes and the same shapes, by making the cross-sectional area of either one of the vessels different, the relationship between the outflow amount from the vessel 5 and the feeding amount from the vessel 4 to the vessel 5 can be changed. Thus, by changing the shapes of the vessels, the mixing ratio can be freely varied. Accordingly, the mixing ratio of the materials in the molded product and the distribution of the constituents in the composite material can be freely varied. Also, it is possible to employ the method in which a closed mixing chamber 18 is provided as shown in FIG. 7 and a mixed dispersion is permitted to flow out therefrom. In this case, dispersions in amounts corresponding to the outflow amounts are fed from the vessels 4 and 5. During this procedure, the mixing ratio and the outflow amount of the mixed dispersion can be controlled by utilizing the valves 19 and/or 20 provided at the feeding channels 6 and 7. The mixing chamber 18 need not be a closed system depending on the purpose, or it may be sometimes omitted.

Figure 8:
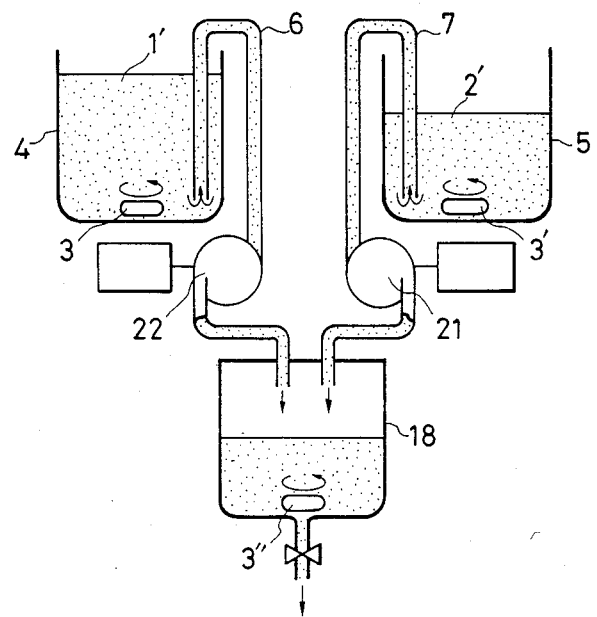

The embodiment shown in FIG. 8 is the method in which the mixing ratio of the mixed dispersion within the mixing chamber 18 is varied by controlling the flow rates of the dispersions by use of the pumps 21 and 22. Also, in this embodiment, the mixing chamber 18 may be sometimes omitted or it may not be a closed system.

Figure 9:
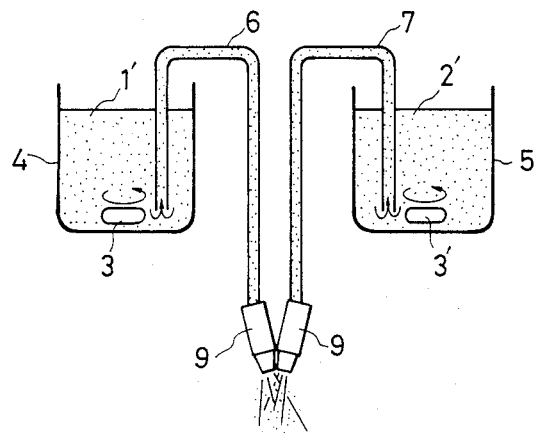

Also, as shown by the embodiment in FIG. 9, without provision of a mixing chamber, the outlets for the respective dispersions may be brought close to each other and the dispersions may be mixed by ejecting by use of ejecting means 9 such as nozzles, etc.

Feeding of the dispersions from the vessels is not required to be practiced by siphon, but feeding pipes may be also provided at the bottom of the respective vessels.

Figure 10:
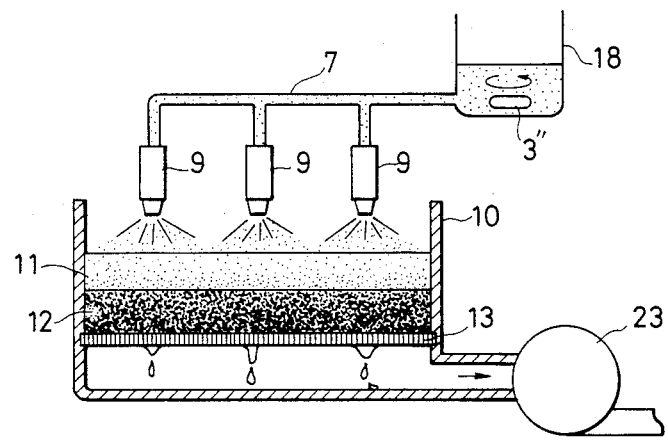
Figure 11:
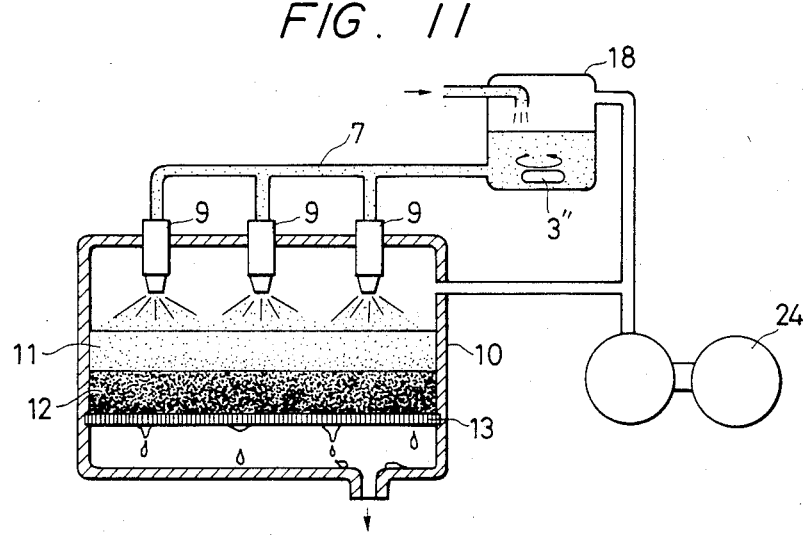

Further, as shown in FIG. 10 to FIG. 11, the methods as shown in FIG. 3, FIG. 6, FIG. 7, FIG. 8 and FIG. 9 can be combined, and the mixing method is not limited to those as exemplifed above.

An example as shown in FIG. 3 has been described as the method for forming the mixed dispersion as obtained above. However, the present invention is not limited to such an exemplary method, but, for example, in the forming device 10 shown in the above example, the forming device can be rotated to obtain the effect of removing deposition irregularity of the ejected particles. In this case, similar effect can also be obtained by rotating the ejecting device 9. Also, by bringing the lower portion of the exemplary filter to reduced pressure by evacuation through a vent 17, the dispersing medium can pass rapidly through the filter 13, whereby the dispersion layer 11 can be removed or made extremely thin.

The embodiment shown in FIG. 10 is an embodiment in which three ejecting devices 9 are provided. In this method, the lower portion of the filter is brought to reduced pressure by use of a pump 23. According to this method, a molded product 12 with large area can be prepared within a short time. As described above, by rotating the portion including the feeding channel 7 and the ejecting device 9, the molded product 12 can be made disc-shaped.

The embodiment shown in FIG. 11 is an embodiment in which forced filtration is practiced by imparting a higher pressure to the upper portion of the filter 13 by use of a compressor 24. Also, in this case, by rotating the forming device 10 without destroying the closed system, a molded product 12 with a large area and a disc-shape can be obtained.

As described above, there are a large number of methods for obtaining molded products having a distribution of mixing ratio of the constituents in the thickness direction, and it is also possible to combine the methods as shown in FIG. 3, FIG. 10 and FIG. 11.

As described above, a molded product in which a change in existing ratio of two or more kinds of components exists in the thickness direction can be obtained. If the molded product is made columnar, the existing ratio of the components can be varied in the length direction.

(Embodiment 2)

Preparation example of a composite material in which the constituents are varied from the center toward the outside or in the opposite direction in Embodiment 1.

Figure 12A:
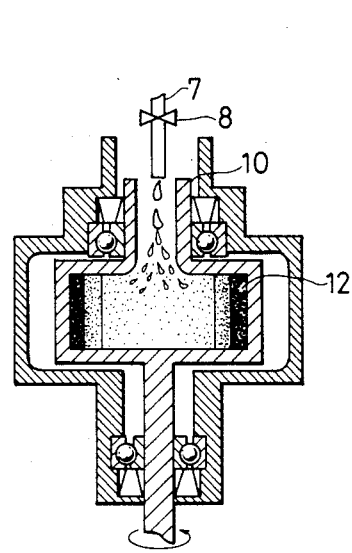

In a similar manner to Embodiment 1, when the mixed dispersion varied in mixing ratio with lapse of time is fed into a rotating rotary system molding equipment 10 with any desired shape rotating at an appropriate speed as shown in FIG. 12A through the feeding inlet thereof, the liquid medium is separated through precipitation separation of the particles on the side wall surface of the molding equipment 10 by the centrifugal force created by rotation of the molding equipment 10. By removing the separated liquid medium according to an appropriate means, the molded product 12 can be formed.

The molding equipment 10 as shown in FIG. 12A is suitable for the case in which the particles in the dispersion are very fine and can not easily be separated from the liquid medium by use of a conventional filtering material. That is, in such a case, a relatively volatile medium may be used as the dispersing medium and the liquid medium may be removed by evaporation during molding or after molding, or alternatively when a nonvolatile liquid medium is employed, the liquid medium separated from the particles after molding may be removed by other means.

Figure 12B:
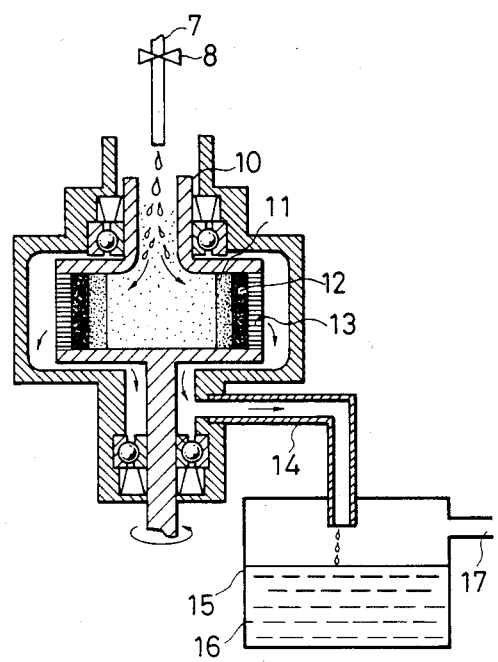

In place of the molding equipment as shown in FIG. 12A, it is also possible to use a molding device of the filter system as shown in FIG. 12B.

In this case, the mixed dispersion flowing out from the tip of the feeding channel 7 is deposited by centrifugal force on the filter 13 in the rotor-shaped rotating molding equipment 10 as shown in FIG. 12B. The liquid 16 which is the dispersing medium passes through the filter 13 and is pulled via the discharging outlet 14 in the tank 15 out of the system. The mixed particles remaining on the filter 13 form a deposited layer, namely a molded product 12. The mixed dispersion flowing out later from the feeding channel 7 is migrated onto the deposition layer 12, thereby forming first a mixed dispersion layer 11, but it is preferable to control the feeding amount of the mixed dispersion and the filtration speed so that no such layer may be formed or such a layer may be made as thin as possible.

Figure 5:
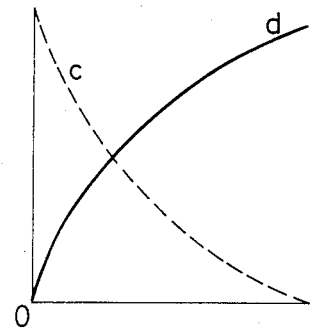

The molded product 12 formed as described above becomes a molded product in which the mixing ratio of the particles 1 is increased in the radius direction from the outer circumference toward the center. The existing ratio of the particles 1 and the particles 2 in the molded product 12 is varied as shown in FIG. 5.

In this case, the abscissa indicates the distance from the rotational center toward the outer circumferential direction, and the ordinate the existing ratio of the particles 1 and the particles 2.

(Embodiment 3)

Figure 13:
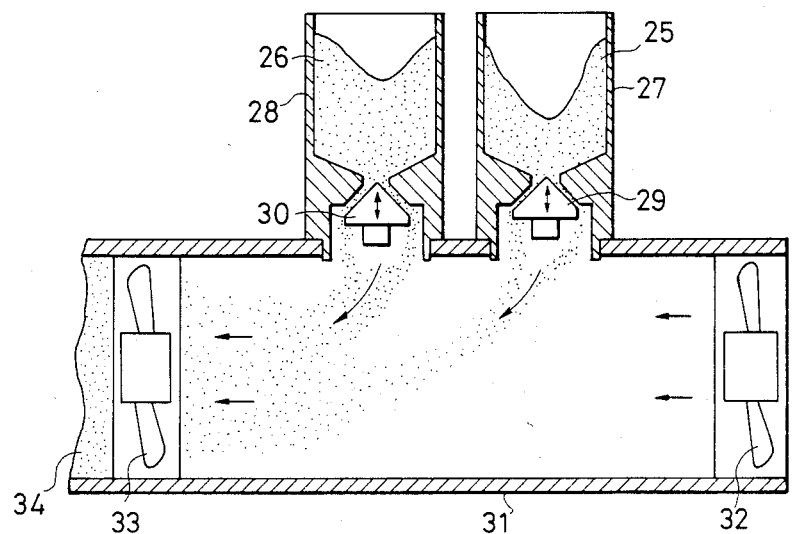

Preparation example of a composite material in which the constituents are varied in thickness direction by use of powder particles:

FIG. 13 shows a preferable method for mixing two kinds of particles while varying the mixing ratio and feeding them into a molding equipment, and 25 in the drawing represents a specific powdery material existing in the vessel 27, 26 another powdery material different from the above powdery material existing in the vessel 28, 29 and 30 poppets controlling the mixing ratio of the powdery materials 25 and 26 by controlling the amounts released of the powdery materials 25 and 26. Poppets 29 and 30 show one example of preferable means for feeding powdery materials 25 and 26 from the vessels 27 and 28.

31 is a transporting pipe of powdery materials, and 32 is an air-sending fan for transporting the powdery materials therein. 33 is a mixing fan for mixing the powdery materials 25 and 26, and 34 is a powdery material mixture comprising the powdery materials 25 and 26.

Into the vessels 27 and 28 are charged powders 25 and 26 which are different from each other. By driving the fan 32 for sending air and the fan 33 for mixing and actuating the poppets 29 and 30, the powdery materials 25 and 26 are released at desired proportions into the transporting pipe 31. The powdery materials 25 and 26 are directed by the fan 32 for sending air toward the fan 33 for mixing on the downstream side to be transported under the mixed state 34.

The mixing ratio of the powdery materials 25 and 26 under the mixed state 34 can be freely controlled by the poppets 29 and 30. For example, while maintaining the total amount released of the powdery materials 25 and 26 from the poppets 29 and 30 at a constant level, first the powdery material 25 is released, subsequently the powdery material 26 is gradually released, and finally only the powdery material 26 is released. By controlling thus the amount released of the powdery materials 25 and 26, the mixing ratio of the powdery materials 25 and 26 varies together with the cumulative amount released. For example, as shown in FIG. 4, the mixing ratio of the powdery material 26 rises linearly as shown by the solid line a. On the other hand, the mixing ratio of the powdery material 25 is lowered linearly as shown by the broken line b.

Figure 14:
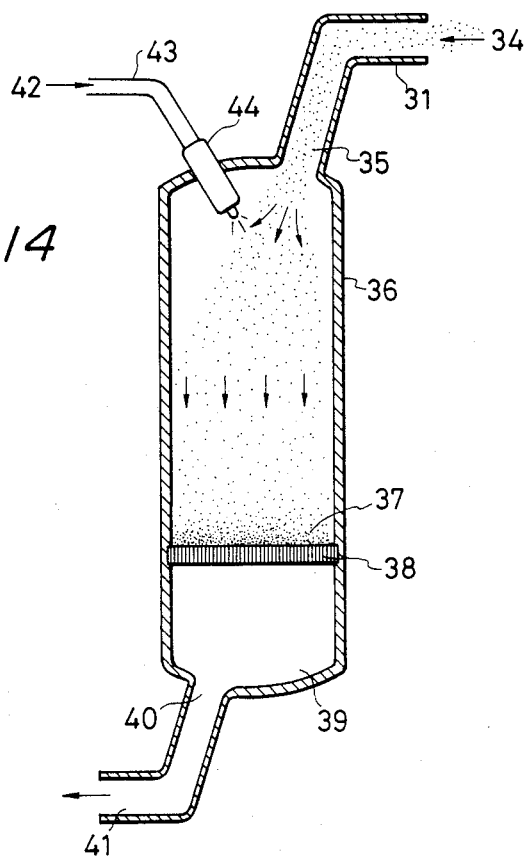

Next, the powdery mixture 34 is transported and fed through an inlet 35 into cylindrical molding equipment as shown in FIG. 14. The distance between the inlet 35 and the filter 38 is made somewhat long, and the mixed powder material 34 falls through gravity force onto the filter 38 to be uniformly deposited, thereby forming a mixed powder layer (molded product) 37. By aspirating by means of an evacuation pipe 41 through an evacuation outlet by providing an aspirating chamber 39 below the filter 38, the deposition rate within the forming device of the mixed powder material 34 can be promoted. When the powdery mixture is varied in mixing ratio as described above, the molded product thus produced becomes a molded product 37 in which the mixing ratio is varied so as to rise from the bottom toward the upper surface in the thickness direction. The existing ratio of the powdery material 25 and the powdery material 26 in the molded product 37 is varied as shown in FIG. 4.

According to the method as described above, the powdery material 25 and the powdery material 26 employed, regardless of their kinds, can become a molded product in which the amounts of the components are varied in any desired manner very easily.

(Embodiment 4)

Figure 15:
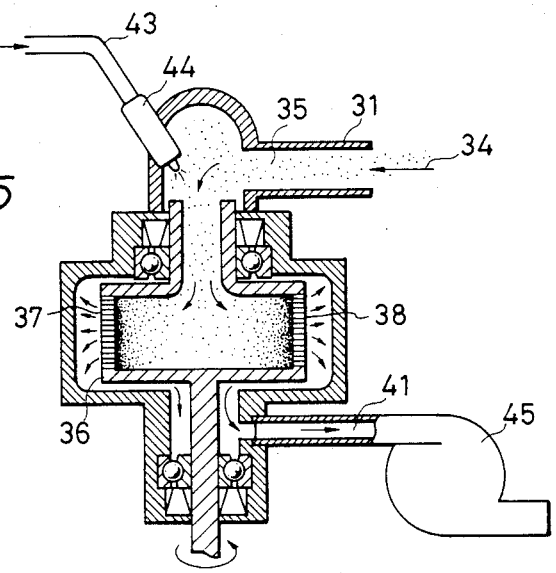

Preparation example of a composite material in which the constituents are varied from the center toward the outer side or in the opposite direction in embodiment 3:

The mixed powdery material 34 mixed as in embodiment 3 is delivered into a rotor-shaped molding equipment 36 which is a preferable example as illustrated in FIG. 15. The space outside of the molding equipment 36 is aspirated through the evacuation pipe 41 by an aspirating pump 45.

The molding equipment 36 is provided on the side thereof with a filter 38, and rotation of the molding equipment 36 urges the mixed powdery material 34 against the filter 38 through centrifugal force and flow. The mixed powder material 34 is deposited on the filter 38 to form a molded product 37. The molded product 37 will have a distribution with the mixing ratio controlled by the poppets 29 and 30 as exemplified in FIG. 13. Therefore, the mixing ratio of the powdery materials 25 and 26 can be varied freely by control of the poppets 29 and 30.

According to the method as described above, the powdery material 25 and the powdery material 26 employed, regardless of their kinds, particle sizes, specific gravities, etc., can be molded into a product 37 in which the ratio of the components is varied in any desired manner from the center toward the outer side or from the outer side toward the center very easily.

In the method as described above, when aspirating evacuation is effected from the lower portion of the filter by use of a molding equipment of the filter type, since the pressure difference between inside and outside of the molding equipment is large, it is preferable to use a filter made of a stainless steel sintered product of high rigidity or support the filter with a supporting member having high rigidity.

Also, in the method using dispersions as described above, the strength of the molded product can be improved by dissolving, for example, binders or temporary coagulating agents, etc., such as various polymers or inorganic colloids in either one or all of the dispersions or, in the case of using powdery materials, by adding these binders or temporary coagulating agents, etc., 42 by passing through the feeding pipe 43 from the jetting device 44 during molding or after molding. These tentative coagulating agents are not required in some cases depending on the kind of the particles employed.

In the step of production, a dispersing medium may be used in some cases, while not in other cases. This may be selected depending on the materials employed or a combination thereof, and among them, there is also a material for which both the method of employing a dispersing medium and the method of employing no dispersing medium can be employed.

Such a selection can be made suitably depending on the working steps, forming characteristic, and the requisite characteristic for the composite material to be prepared.

Having described above the typical methods for obtaining the composite material of the present invention, the composite material of the present invention is not limited to those prepared according to these exemplary methods. For example, when employing powdery materials, the composite material of the present invention can be obtained also by use of injection molding equipment or extrusion molding equipment used for molding of synthetic resins in the prior art. When using such molding equipment, the hoppers of the molding equipment may be made to have the constitution as shown in FIG. 13, or alternatively the mixing ratio of the constituents may be varied in said hopper even in the case of a single hopper.

In the above embodiments 2 and 4, description has been made of an example in which the constituents are varied from the center toward the outer side or in the opposite direction by use of a rotary type molding equipment. In such a method, if the molded product is molded in the shape of a doughnut and said doughnut-shaped molded product is cut into an appropriate width, the change of the constituents in said cut product may be said to be in the thickness direction. For example, by use of a molding equipment with a large diameter, a thin molded product with thickness smaller than the diameter can be formed and cut, whereby it becomes a molded product substantially approximate to a flat plate, whereby the change in constituents may be properly said to reside rather in the thickness direction than in the radius direction (center→outer side, center←outer side).

The components to be used in the present invention comprise two or more kinds of materials, and any of the materials which have different physical properties from each other and can be finally solidified may be used, including the powdery particles as exemplified in the above methods, or dispersions. Further, they can be inorganic materials or organic materials, or even mixtures thereof.

Also, the components constituting the composite material as described above may be reactive with each other. When such reactive components are used, the existing ratio of the components can be varied with different reaction products by varying the mixing ratio of these reactive components, as in the case of forming a product of $A_nB_m$ through the reaction of the components A and B at any desired ratio.

The components to be used are not limited to solids, but those capable of being solidified finally may be used. For example, in the case of a gas, said gas may undergo reaction or decomposition to form a solid, or in the case of a liquid, it may be solidified through reaction, cooling or others.

Typical examples of inorganic particles may include various kinds of metal particles or alloy particles in general to be used in powder alloy techniques and sintered steel techniques, particles of high melting metals such as tungsten, molybdenum, rhenium, tantalum, titanium, etc., ultra-hard alloy powder, electromagnetic material particles, atomic power material particles, abrasive material particles, pigment particles, filler particles for rubber and plastics, powder for paper making, powder for pharmaceuticals, powder for agriculture, powder for composite material known in the art, material particles for catalyst or catalyst carrier, adsorbent particles, ceramic powder, glass powder, particles of carbides, nitrides, borides, oxides, etc., of metals.

Other typical examples of inorganic materials may include aqueous sols of silica, titania, zirconia, alumina and otherwise metal oxides, hydroxides, etc., as mentioned above. These sols can be used either as a mixture with each other or as a mixture with the particles of inorganic materials as mentioned above. They are preferable materials, since they can also function as the dispersing medium for these particles of inorganic materials.

Also, gaseous inorganic materials may be those which can be finally solidified by the change in state through cooling, reaction, decomposition, association and others. For example, there may be employed $SiH_4$, $Si_2H_6$, $SiCl_4$, $SiCl_3$, $SiH_2Cl_2$, $GeH_4$, $AsH_3$, $PH_3$, $B_2H_6$, $H_2Se$, $AsCl_3$, $PCl_3$, $PCl_5$, $POCl_3$, $SbCl_5$, $SnCl_4$, etc., or metal vapors formed by heating, and others.

On the other hand, typical examples of organic materials may include particles, molten products of natural or synthetic materials, their solutions, dispersions or precursors (monomer, prepolymer, oligomer) for forming synthetic materials, etc. For example, particles and short fibers of thermoplastic synthetic resins such as acrylic resins, polyester resins, polyamide resins, polyimide resins, polycarbonate resins, polystyrene resins and others or thermosetting resins such as phenol resin, urea resin, melamine resin, alkyd resin and others, and further particles or solutions of natural materials such as cellulose, chitin, chitosan, starch, protein, enzyme, nucleic acid and others can be used similarly as the inorganic materials as mentioned above. When these particles or solutions are employed, they can be easily fixed by heating or removal of the solvent, and also the molten products, solutions, precursors, etc., of the organic materials as mentioned above may be solidified after molding according to conventional methods such as cooling, removal of the solvent, polymerization or crosslinking of the precursors, etc.

Organic materials are not limited to the polymers as mentioned above, but organic compounds such as organometallic compounds, various kinds of colorants such as dyes, pigments, etc., surfactants, pharmaceuticals, biological substances such as nucleic acids, enzymes, hormones, vitamins, proteins, amino acids, etc., or gaseous organic compounds which can be finally solidified by the change in state through cooling, reaction, decomposition, association or others similarly as the aforesaid inorganic gases or which can be fixed by dissolution or absorption into other components can be also used.

Also, in the present invention, the inorganic material and the organic material can be used as a mixture. For example, by use of both materials as a mixture, a composite material comprising components having physical properties which are remarkably different from each other can be easily molded. These composite materials provided by the present invention are characterized in that the constituent components are varied in existing ratio in at least one direction of the molded product, as different from the composite materials of the prior art such as metal vapor deposited plastic moldings, filler containing plastic moldings or alloys, in which the constituents are uniform as a whole or separated in layers.

The components to be used in the present invention as described above are required to be used as a mixture of two or more kinds of components having different physical properties. And, their states, combinations and a number of components are not limited, provided that there are two or more kinds of components. For example, by use of two kinds of components, the mixing ratio of both components may be continuously varied as described above with respect to the above principle. In the case of three components, one component of them may be made always at a constant mixing ratio, while the other two components may be varied in mixing ratio.

As described above, a molded product in which components with different physical properties exist at a varying ratio in at least one direction of the molded product can be obtained, and the molded product which can be used for various uses is taken out as such from a molding equipment and provided for use. On the other hand, when inorganic particles or organic particles are used as the material, it is preferable to practice the treatment of solidification for improvement of the strength of the molded product. For example, when the material employed comprises inorganic particles such as metal powders or ceramic material powders, the molded product should preferably be subjected to heat treatment at an appropriate temperature of, for example, 500° to 2500° C. to sinter the particles, thereby solidifying the molded product as a whole. On the other hand, in the case of organic particles, heat treatment may be conducted at a temperature at which at least one of the constituents may be fused, for example, about 50° to 250° C. Of course, these temperatures vary depending on the constituents.

Otherwise, when the materials employed are sols, solutions, melted liquids, polymer precursors, etc., solidification treatments known in the art such as reaction, gelling, evaporation of liquid medium, cooling, polymerization, crosslinking, heat treatment, etc., may be applied.

Whereas, when the present invention is applied particularly for an optical material, particles or powders of inorganic materials and organic materials as shown below may be utilized.

That is, in the present invention, two or more kinds of inorganic particles are employed on the basis of the above principle, and any inorganic particles which can be finally solidified and may sometimes be made transparent can be used. Such different inorganic particles may be preferably inorganic particles capable of giving refractive indices different from each other, either from the beginning or finally.

Typical examples of useful inorganic particles may include various kinds of metal oxides capable of forming glassy materials such as $SiO_2$, $TiO_2$, $SnO_2$, $ZrO_2$, $B_2O_3$, $As_2O_3$, $Sb_2O_3$, $V_2O_5$, $P_2O_3$, $UO_3$, $MoO_3$, $Al_2O_3$, $Fe_2O_3$, $Cr_2O_3$, $Mn_2O_3$, $K_2O$, $Na_2O$, $Li_2O$, $Cu_2O$, $Cs_2O$, $Tl_2O$, $PbO$, $CaO$, $MgO$, $BaO$, $ZnO$, $FeO$, $MnO$, $CdO$, $CuO$, $CoO$, $NiO$, $SrO$, etc., or a metal salts capable of forming these metal oxides; also phosphates such as $LiPO_3$, $Al(PO_3)_3$, $AgPO_3$, etc.; nitrates such as $Mg(NO_3)_2$, $LINO_3$, $NaNO_3$, $Ca(NO_3)_2$, $CsNO_3$, $Cd(NO_3)_2$, etc.; borates such as $Na_2B_4O_7$, etc.; carbonates such as $Na_2CO_3$, $BaCO_3$, $CaCO_3$; halides such as $BeF$, $AlF_3$, $CaF_2$, $BaF_2$, $PbF_2$, $NaF$, etc.; and other inorganic salts which can be used as such for starting materials for glass. Such various kinds of glass starting materials should preferably be ground finely by means of various kinds of mills before use.

Also, preferable inorganic particles to be used in the present invention are amorphous particles. It is known in the art to melt a combination of various metal oxides as mentioned above and form a super-cooled liquid to form a glass, and it is also well known that glasses having various refractive indices can be obtained according to various combinations of inorganic particles.

In the present invention, these well known various glasses are formed into particles and at least two kinds thereof are used as the particles having different refractive indices from each other. Since these glass particles have been already formed into glass as a matter of cource, they can be solidified and made transparent after molding according to the above principle at lower temperature and within shorter time as compared with the example using metal oxides as described above. Further, it is also possible to use a mixture of glass forming metal oxides or metal salts as mentioned above with the glass particles as described above and the properties of glass itself can be freely changed together with refractive index of the optical element obtained by use of these mixtures.

In the present invention, it is also possible to use inorganic particles which may be starting materials for chalcogenide glass, for example, chalcogen or chalcogenide other than oxygen such as sulfur, selenium, tellurium or compounds thereof and particles of metals such as arsenic, germanium, lead, tin, silver, cadmium, etc.

The examples as mentioned above are preferable examples of inorganic particles to be used in the present invention. Such inorganic particles are used as a mixture or as a dispersion in a dispersing medium, either case requiring fluidity. The dispersing liquid medium to be used is not particularly limited, but a liquid which can be removed relatively easily in process (e.g. volatile liquid) may be preferably used. In dispersing inorganic particles, for improvement of dispersing stability, binders, surfactants, dispersing agents, protective colloids as mentioned above which can be easily removed later can be also used, as a matter of course. It is also preferable to use a dispersing medium having a specific gravity approximate to that of inorganic particles for preventing precipitation of inorganic particles.

The above examples are particularly preferable examples in the present invention, and any other inorganic particles can be used as the subsidiary component for these inorganic particles as a matter of course. For example, if these subsidiary components are inorganic particles, they can be used as one kind of the above inorganic particles, or if they are liquid such as aqueous solutions, etc., they can be used as binders, etc., or they can be impregnated in the molded product after molding.

The inorganic particles to be used in the present invention as described above may have any desired particle size or any desired shape, but in view of readiness in dispersing and mixing and homogeneity of the molded product obtained, they should preferably have an average particle size of about 1 to 300 $\mu$m, preferably about 1 to 5 $\mu$m.

As the organic material to be utilized in the present invention, there may be employed, for example, (meth)acrylate type polymers (in the present specification, (meth)acrylate means to include both of acrylate and methacrylate, hereinafter the same) such as homopolymers comprising (meth)acrylate monomer such as trifluoroethyl (meth)acrylate, trifluoroisopropyl (meth)acrylate, 2-methoxyethyl (meth)acrylate, butyl (meth)acrylate, methyl (meth)acrylate, cyclohexyl-$\alpha$-bromoacrylate, p-cyclohexyl phenyl (meth)acrylate, o-chlorobenzyl (meth)acrylate, $\beta$-naphthyl (meth)acrylate, etc., copolymers of these monomers or with other vinyl monomers; vinyl type polymers such as homopolymers comprising vinyl type monomers such as vinyl hexyl ether, vinyl propionate, 4-methyl-1-pentene, vinylidene fluoride, isobutene, (meth)acrylonitrile, styrene, p-isopropylstyrene, vinylnaphthalene, vinylcarbazole, ethylene, propylene, butadiene, isoprene, etc., copolymers comprising these monomers or these monomers with other monomers; cellulose type polymers such as cellulose acetate, nitrocellulose, etc.; polycarbonate type polymers such as polytrimethyleneglycol carbonate, poly-2,2-bis(4-oxyphenyl)propane carbonate, etc.; polyester type polymers such as polyethylene terephthalate, polybutylene terephthalate, etc.; polyamide type polymers such as nylon 6, nylon 66, nylon 612, etc.; polyurethane type polymers; or blend polymers comprising the above polymers are the main component; etc.

The polymers as mentioned above are particularly preferable examples in the present invention and, other than those, the crosslinked polymers obtained by crosslinknng the polymers as mentioned above, thermoplastic resins such as phenol resin, melamine resin, urea resin, alkyd resin, etc., or fine powder of a thermally cured resin can also be used.

Among the various polymers as mentioned above or the polymers which are not exemplified, particularly preferred in the present invention are non-crystalline polymers having high transparency, for example, (meth)acrylic polymers, styrene type polymers, and polycarbonate type polymers.

One specific feature of the present invention resides in that various kinds of polymers as mentioned above can be used according to any combination irrespectively of their kinds. That is, in the method of the prior art, monomers which are not mutually copolymerizable cannot be used, and it has been also impossible to use in combination a vinyl polymer and a condensation type or polycondensation type polymer. In contrast, in the method of the present invention, there exist none of such various restrictions.

The above examples are particularly preferable examples in the present invention, and it is also possible to use any other organic material as the subsidiary component for these organic powders as a matter of course. For example, if these subsidiary components are powders, they can be used as one kind of the above organic powder materials, or if they are liquid such as aqueous solutions or dispersions, etc., they can be used as a temporary coagulating agent or they can be impregnated into the molded product after molding.

The organic powdery material to be used in the present invention as described above may have any desired particle size or any shape, but in view of easiness in conveying and mixing and homogeneity of the molded product obtained, it should preferably have an average particle size of about 1 to 300 $\mu$m, preferably about 1 to 5 $\mu$m.

Besides the above inorganic and organic materials, as the organometallic material, metal alkoxide (alcoholate) obtained by the sol-gel method may be employed.

According to the present invention as described above, there is provided a composite material which has not been substantially known in the prior art, namely a composite material molded product comprising two or more kinds of components, wherein the composition of the molded product is varied in at least one direction of the molded product. These molded products have specific functions which have not been known in the prior art and they are useful as, magnetic materials, electroconductive materials, semiconductive materials, insulating materials, thermally conductive materials, heat-resistant materials, hard materials, abrasive materials, optical materials, fluorescent materials, various sensors, bonding materials, ceramic materials, catalyst materials, medical materials, display materials, recording materials, and others.

The present invention is described in more detail by referring to the following Examples, in which parts and % are by weight unless otherwise particularly noted.

EXAMPLE 1

Fine particles of a thermoplastic resin and fine particles of an additive were used as the starting materials. To the greater vessel of the mixing device as shown in FIG. 2 having two vessels with a volume ratio of 10:9, a 10% suspension of the fine particles of the thermoplastic resin in butanol was charged, while a 10% suspension of the fine particles of the additive in butanol to the other vessel in amounts in proportion to the volumes of the respective vessels. Following the method as described above by use of a siphon, feeding channels were equipped at the two vessels and a take-out pipe was equipped at the vessel containing the butanol suspension of the thermoplastic resin to permit the mixture to flow out.

Into the molding equipment shown in FIG. 3, the above mixture was permitted to flow in. The inflow rate of the mixture was made to coincide with the filtering rate of the solvent.

Thus, a disc-shaped molded product was obtained in the molding equipment. The existing ratio of the thermoplastic resin was successively higher toward the bottom drrection, and the existing ratio of the additive was successively higher toward the upper direction.

The molded product was subjected to fusion under pressure while degassing at a temperature near the softening points of the thermoplastic resin employed to obtain the composite material of the present invention. These composite materials of the present invention were materials in which the concentration of the additive was varied continuously in the thickness direction, following the additives employed.

The combinations of the thermoplastic resins and the additives employed were as follows.

(1) Polybutylene terephthalate and electroconductive carbon black.

(2) Polyacrylate and photoconductive organic pigment.

(3) Polysulfone and alumina type abrasive.

(4) Polyethylene terephthalate and $CrO_2$ type magnetic particles.

(5) Polyethylene and heat-absorptive pigment.

(6) Silicone rubber and metal particles with great electroconductivity.

The composite material of the present invention as described above, being different from the coated type or the laminated type composite material of the prior art, comprised a thermoplastic resin and an additive which were incorporated integrally at all portions. Further being different from the kneaded type composite material of the prior art, the composite material was found to be markedly improved in the respective performances and strength of the molded product, since the existing ratio of the additive was high only in the portion where functional characteristic was demanded. Particularly, the composite material in the case of the above (6) was found to have high electroconductivity as compared with the material in which these metal particles are uniformly dispersed in silicone rubber, and besides it was resistant to high voltage and large electric current, and therefore it is useful as electroconductive rubber for input switch, code, mat-shaped switch of precise instruments, or as materials at the connecting portion or surrounding portion of wiring substrate of LSI.

EXAMPLE 2

The starting materials used were powders of A and B shown below, and methanol was used as the dispersing medium. Similarly as in Example 1, the mixture was permitted to flow out while controlling its flow rate.

While rotating the molding equipment as shown in FIG. 12A at a speed of 4500–6000 rpm, and the above mixture was permitted to flow in through the center thereof. Evaporation of the solvent was promoted by heating the molding equipment to 70°–80° C., and the inflow rate of the mixture was made to coincide with the evaporation rate of the solvent.

Thus, a disc-shaped molded product was obtained in the molding equipment. In the above method, the molded product was obtained by using a mixture of a polyamide powder, a ferrite type magnetic powder and fine carbon short fibers (mixing ratio 2:1:1) as starting material A and a mixture of polyamide powder and fine carbon short fibers (mixing ratio 3:1) as the starting material B. The molded product was found to have a ratio of polyamide:ferrite type magnetic powder:carbon short fiber of 2:1:1 at the outer peripheral portion and a ratio of 3:0:1 at the center portion. This molded product was subjected to fusion under pressure while degassing at a temperature of the softening point of the polyamide to obtain the composite material of the present invention.

This composite material was reinforced with carbon short fibers as a whole and also had the function of a plastic magnet in and near the outer periphery, and therefore it is useful as a member for precise instruments such as cameras, watches, etc., and also for electrical articles.

The molded products obtained from a combination of ABS powder and copper powder or a combination of ABS powder and aluminum powder as the above A and B is useful as a highly effective electromagnetic wave shielding material or antistatic material.

By carrying out forming and solidification as described above by use of the materials according to the combinations as exemplified in Example 1, composite materials of the present invention having concentration distribution in the radius direction can be obtained.

EXAMPLE 3

Powders of TiC and $B_4C$ were used as the starting materials. Into one of the vessels of the device shown in FIG. 13 was charged the TiC powder, and $B_4C$ powder into the other. While flowing a carrier gas into the transporting pipe, a fan for sending air and a fan for mixing were rotated and the poppets provided in the vessels were actuated to release each of the TiC powder and $B_4C$ powder into the transporting pipe.

The poppets were controlled during this operation. With the total amount discharged from the two vessels being made constant, first only TiC was discharged. And, after a while, the powder of $B_4C$ was discharged. The amounts discharged from the two vessels were varied gradually, until at the time of completion of molding, only the powder of $B_4C$ was discharged. During this operation, deposition of the mixed powdery material on the filter was accelerated by aspiration by means of a vacuum pump through the discharging outlet of the molding equipment. By use of a cylindrical molding equipment, a flat disc-shaped molded product was obtained. This was a molded product with successively higher existing ratio toward the bottom direction and successively higher existing ratio of $B_4C$ toward the upper direction.

The existing ratio of $B_4C$ was varied from 0% at the lower end portion to 100% toward the upper end portion.

The molded product was sintered under 500 kg/cm$^2$ at 2000° C. for 2 hours, followed by gradual cooling, to obtain the composite material of the present invention.

The composite material of the present invention obtained in the steps as described above had ultrahardness and abrasion resistance of TiC on one end, with the other end having chemical resistance of $B_4C$, and the intermediate portion had the intermediate characteristic corresponding to the distances from the respective ends, and it is useful as a composite material for which corrosion resistance is demanded.

Also, in the above method, materials according to the combinations shown below were employed to obtain molded products comprising the respective combinations, followed by sintering at appropriate temperatures to obtain the composite materials of the present invention.

(1) $W_2B_5$ (heat resistance), $B_4C$ (high electrical resistance, chemical resistance);

(2) ZrC (antioxidation property) and $ZrB_2$ (high electroconductivity);

(3) SiC (semiconductivity) and WC (hardness and abrasion resistance);

(4) SiC (heat resistance) and $MoSi_2$ (chemical resistance).

EXAMPLE 4

The materials employed were iron powder, high carbon ferromanganese powder (C: 6.67%, Si: 0.1%, Mn: 73.65%, P: 0.14%, S: 0.008%, iron: 19.43%), graphite powder and zinc stearate powder.

Into one vessel was charged a powdery mixture (A) comprising 77.4% of iron powder, 21.7% of high carbon ferromanganese powder, 0.12% of graphite powder and 0.8% of zinc stearate powder.

Into the other vessel was charged a powdery mixture (B) comprising 88.9% of iron powder, 9.5% of high carbon ferromanganese powder, 0.81% of graphite powder and 0.8% of zinc stearate powder.

The powdery mixtures A and B were fed into the molding equipment shown in FIG. 15 while being mixed similarly as in Example 3, and the molding equipment was rotated. And, the molding equipment was externally brought into reduced pressure by means of an aspirating pump. The amounts of the powders released were controlled by control of the poppets with only B being released at first and finally only A being released. Then, molding was completed by spraying acetone as the temporary coagulating agent. Thus, a disc-shaped molded product was obtained. This was found to be successively higher in existing ratio of B toward the outer peripheral direction and successively higher in existing ratio of A toward the center direction. The manganese concentration was increased from 7% at the outer peripheral to 16% toward the center portion.

The molded product was calcined by a sintering-forging method according to the heating program as shown below in a desired heating furnace to obtain the composite material of the present invention.

(1) The molded product was formed again under 390 MPa.

(2) The molded product was inserted into a furnace under argon atmosphere heated to 1200° C.

(3) After 1 hour, the molded product was transferred onto a mold cavity surface.

(4) The molded product was forged under a pressure of 800 MPa.

(5) Water quenching from 1050° K into water of normal temperature was performed.

The composite material of the present invention obtained in the steps as described above was subjected to measurement of mechanical strength at the center portion and the outer peripheral portion to obtain the following results.

|  | Center portion | Outer peripheral portion |
|---|---|---|
| Tensile strength | 800 MPa | 500 MPa |
| Impact value | 1.8 KJ/m² | 0.5 MJ/m² |

This was a composite material having different mechanical strength at the central portion and the outer peripheral portion and, in view of easiness of working, etc., it is useful as the sintered forged material or construction material because of having mechanical properties similar to forged materials of heat treated material.

Also, by using the materials according to the combinations shown below in the above method, composite materials of the present invention were obtained following the same procedure as described above.

(1) Copper-carbon alloy powder and iron powder.

(2) Chromium-carbon alloy powder and iron powder.

EXAMPLE 5

Molten iron liquid was divided into two vessels, and in one of the molten liquids 6% of titanium and 1.5% of carbon were mixed. As shown in FIG. 7, the flow rates of the molten liquids from the two vessels were controlled by use of valves. The above molten liquids were permitted to flow into the rotary molding equipment based on the same principle as in FIG. 12A. During inflow, the rate of solidification of the molten liquid in the molding equipment was made to coincide with the inflow rate of the molten liquid.

First, only the molten iron liquid was permitted to flow in, with the inflow amount of the molten liquid containing titanium and carbon being gradually increased.

Thus, the composite material of the present invention was obtained.

In this composite material, titanium and carbon existed in the solidified alloy as an eutectic high melting carbide (TiC).

The deformation resistance values (kg-m) at the outer portion and the center portion of the molded product were found to be 14 kg-m and 27 kg-m at 1000° C., and the deformation resistance value was found to change continuously. This composite material was found to be useful as a heat-resistant material for heat exchanger.

Also, the following combinations of materials were employed in the above method to obtain composite materials of the present invention.

(1) Fe-Ni-Cr alloy and Ti-C alloy.

(2) Ni-Cr-W alloy and Nb-C alloy.

(3) Aluminum alloy and $Al_2O_3$.

(4) Aluminum alloy and SiC.

Particularly, the composite materials of (3) and (4) when using Al-Mg-Si alloy as the aluminum alloy in the above (3) and (4), an abrasion resistance of 5-fold or more of that of the aluminum alloy of the prior art was exhibited at the portion with a high existing ratio of $Al_2O_3$ and SiC.

Also, in molding, in addition to the method as exemplified above, known methods such as die cast, etc., can also be utilized.

EXAMPLE 6

To the powder of ZnO, powders of $Co_3O_4$, $La_2O_3$ and $Pr_6O_{11}$ were added in amounts of 0.5%, 2% and 1.8%, respectively, to give a mixed powder A.

On the other hand, to the powder of $SiO_2$, powders of $Co_3O_4$, $La_2O_3$ and $Pr_6O_{11}$ were added in amounts of 0.5%, 2% and 1.8%, respectively, to give a mixed powder B. After each of the above powders A and B was mixed well respectively by means of a mortar machine, A was calcined at 700° C. and B at 1000° C.

Then, each mixture was crushed into fine powder. Each of the finely pulverized mixed powder A and B was charged into the hopper as shown in FIG. 13, and the mixing ratio was varied by control of the poppets. For the molding equipment, the rotatory molding equipment shown in FIG. 15 was employed and molding was carried out by use of methanol as the temporary coagulating agent.

The molded product obtained was found to be zero in existing ratio of ZnO at the outer peripheral portion, and zero in existing ratio of $SiO_2$ around the center.

Figure 16:
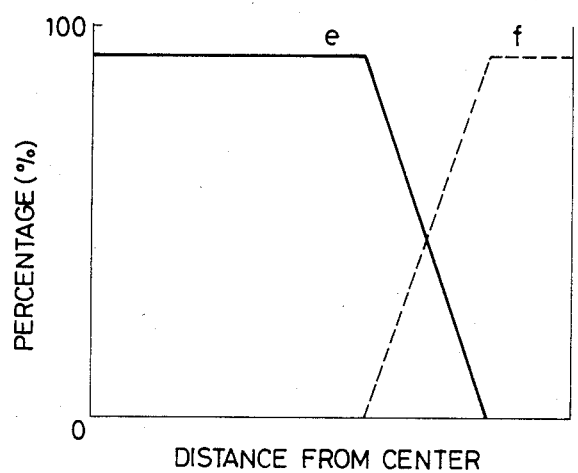
FIG. 16 is a diagram for illustration of one example of the present invention.

The relationship between the relative existing ratio of $SiO_2$ and ZnO and the distance from the center of the molded product was as shown in FIG. 16. In FIG. 16, the solid line e shows the existing ratio of ZnO, and the broken line f the existing ratio of $SiO_2$.

The molded product was fired according to the heating program as shown below.

(1) Heated at a temperature elevation rate of 2° C./min. to 200° C., while continuing degassing.

(2) Maintained under degassed state at 200° C. for 10 hours.

(3) Heated at a temperature elevation rate of 2° C./min. up to 1400° C. During this period, degassing operation was also continued.

(4) Maintained under degassed state at 1400° C. under 300 kg/cm² for 2 hours.

(5) Application of pressure stopped and cooled at a temperature lowering rate of 2° C./min. down to 900° C. while degassing.

(6) Cooled while degassing at a temperature lowering rate of 0.2° C./min. from 900° C. to 700° C.

(7) Degassing operation by a pump stopped, and the product left to cool as such in the furnace.

The composite material of the present invention obtained in the above steps was found to be useful as ZnO varistor, and it also requires no covering or coating at the peripheral portion with an insulating material and therefore is useful as members for electrical articles as well as industrial instruments such as semiconductor powder converters, etc.

EXAMPLE 7

In this example, fine particles of $SiO_2$ and $GeO_2$ were used as the starting materials. Two vessels of the same shape and the volume as shown in FIG. 2 were provided. Into one vessel, a dispersion of fine particles of $SiO_2$ was charged, and a dispersion of the same volume of a mixture of fine particles of $SiO_2$ and $GeO_2$ (mixing ratio 1:1) was charged into the other. Folowing the method as described above, feeding channels were provided at the two vessels and a takeout pipe was connected into the $SiO_2$ dispersion, thereby permitting the mixed dispersion to flow out. The molding equipment as shown in FIG. 12B was rotated at a speed of 4500 rpm, and the mixed dispersion was permitted to flow in through its center. The external portion of the filter was brought to reduced pressure by means of a pump to promote filtration. Thus, within the molding equipment, a disc-shaped molded product was obtained. This was found to have a distribution with successively higher $SiO_2$ concentration toward the outer circumferential direction and successively higher $GeO_2$ concentration toward the center direction. The existing ratio of $GeO_2$ is 0 to 50% from the outer circumference toward the center.

The molded product was sintered according to the heating program as shown below in a desired calcining furnace, while performing degassing operation by means of a vacuum pump to obtain an optical material.

(1) Heated at a temperature elevation rate of 2° C./min. up to 400° C., while continuing degassing.

(2) Maintained under degassed state at 400° C. for 50 hours.

(3) Heated at a temperature elevation rate of 2° C./min. up to 800° C., while it is being degassed.

(4) Maintained under degassed state at 800° C. for 4 hours.

(5) Heated while it is being degassed at a temperature elevation rate of 2° C./min. up to 1000° C.

(6) Maintained under degassed state at 1000° C. for 5 hours.

(7) Maintained under degassed state at 1000° C. under pressurization of 120 kg/cm² for 8 hours.

(8) Application of pressure stopped, and cooled while being degassed at a temperature lowering rate of 2° C./min. down to 900° C.

(9) Cooled while it is being degassed at a temperature drop speed of 0.1 ° C./min. from 900° C. to 700° C.

(10) Degassing operation by means of a vacuum pump stopped, and the product left to cool naturally as such in the furnace.

When the refractive index distribution of the optical material obtained in the above steps was measured, it was found to be disc-shaped optical material with greater refractive index at the center portion and the refractive index being smaller toward the outer circumference. This was found to be useful as an optical element.

With the use of the same starting materials without use of a dispersing medium, a product similar to that obtained above could be obtained by means of the device as shown in FIG. 13 and FIG. 15.

EXAMPLE 8

In this example, two kinds of glass powders with particle sizes of 1 to 10 μm having different refractive indices were used as inorganic particles. One was a frit type glass (F-2) having high refractive index and the other was a crown type glass (K-3) having low refractive index.

In one of the vessels of a mixing device as shown in FIG. 8, a dispersion of a 1:1 mixture of the F-2 glass powder and the K-3 glass powder in acetone was charged, and in the other vessel was charged a dispersion of only the K-3 glass powder in acetone. Volumes of both dispersions were made the same. While mixing both dispersions in a mixing tank by actuation of the pump provided in the course of the feeding pipe, the mixture was fed into the rotating molding equipment as shown in FIG. 12A. While maintaining the total outflow amount per hour of both dispersions constant, first only the K-3 glass powder dispersion was permitted to flow out, subsequently the outflow amount of the dispersion of mixed glass powders of F-2 and K-3 was gradually increased until only the dispersion of the mixed glass powders of F-2 and K-3 was permitted to flow out on completion of forming. During this procedure, acetone which was the dispersing medium was removed by evaporation from the molding equipment to obtain a flat disc-shaped molded product.

The molded product was found to be higher successively in the relative existing ratio of the K-3 glass powder from the center toward the outer circumferential direction, with the existing ratio of the F-2 glass powder being 0 to 50% from the outer circumference toward the center direction.

The molded product was sintered according to the heating program as shown below in a desired calcining furnace, while performing degassing operation by means of a vacuum pump, to obtain an optical material.

(1) Heated at a temperature elevation rate of 2° C./min. up to 400° C., while being degassed.

(2) Maintained under degassed state at 400° C. for 30 hours.

(3) Heated at a temperature elevation rate of 2° C./min. up to 900° C., while it is being degassed.

(4) Maintained under degassed state at 900° C. under pressurization of 120 kg/cm$^2$ for 2 hours.

(5) Application of pressure stopped, and cooled while degassing at a temperature lowering rate of 2° C./min. down to 700° C.

(6) Cooled while degassing at a temperature lowering rate of 0.1° C./min. down to 400° C.

(7) Degassing operation by means of a vacuum pump stopped, and the product left to cool spontaneously in the furnace.

When the refractive index distribution of the optical material obtained in the above steps was measured, it was found to be a disc-shaped optical material with a large refractive index of 1.57 around the center and a small refractive index of 1.52 around the outer circumference, and this is useful as an optical element.

EXAMPLE 9

In this example, a powdery mixture with a composition of 36.0% of $Na_2CO_3$, 36.9% of $K_2CO_3$, 43.5% of $SiO_2$, 43.0% of PbO and 30.6% of $Al_2O_3$ was used as one of the in organic particles (A) and a powdery mixture with a composition of 37.8% of $Na_2CO_3$, 13.5% of $K_2CO_3$, 60.2% of $SiO_2$ and 18.5% of PbO as the other inorganic particle (B).

Both powdery mixtures were dispersed respectively in acetone to provide dispersions and both dispersions were charged into the two vessels of a mixing device as shown in FIG. 7 in the same volume, respectively. Both dispersions were fed into the rotating molding equipment as shown in FIG. 12B, while maintaining the total outflow amount of both dispersions per hour and varying the relative outflow amounts of the both dispersions by actuating the valve provided in the course of the two feeding pipes. The relative outflow amounts of the both dispersions were varied, while the total amount is maintained thereof constant, such that only the dispersion A was flowed out initially, then the outflow amount of the dispersion A was reduced with gradual increase of the outflow amounts of the dispersion B, until only the dispersion B was permitted to flow out on completion of formation. During this procedure, acetone which was the dispersing medium was removed from the molding equipment through pressure difference and centrifugal force out of the system to obtain a flat disc-shaped molded product.

This molded product was found to be successively higher in relative existing amount of the powdery mixture A from the center toward the outer circumferential direction, with the relative existing ratio of the powdery mixture B being successively higher from the outer circumference toward the center direction.

The respective component concentrations in this molded product were found to vary from the outer circumference toward the cente direction as follows.

$Na_2CO_3$; 5.4%→5.9%
$K_2CO_3$; 4.9%→7.8%
$SiO_2$; 70.6%→79.7%
PbO; 18.8%→6.6%
$AS_2O_3$; 0.3%→0%

This molded product was sintered according to the heating program as shown below in a desired calcining furnace while performing degassing operation by means of a vacuum pump to obtain an optical material.

(1) Heated at a temperature elevation rate of 2° C./min. up to 200° C., while continuing degassing.

(2) Maintained under degassed state at 200° C. for 10 hours.

(3) Heated at a temperature elevation rate of 2° C./min. up to 900° C., while it is being degassed.

(4) Maintained under degassed state at 900° C. under pressurization of 120 kg/cm$^2$ for 2 hours.

(5) Application of pressure stopped, and cooled while degassing at a temperature lowering rate of 2° C./min. down to 450° C.

(6) Cooled while degassing at a temperature lowering rate of 0.1° C./min. from 450° C. to 200° C.

(7) Degassing operation by means of a vacuum pump stopped, and the product left to cool naturally as such in the furnace.

When the refractive index distribution of the optical material obtained in the above steps was measured, it was found to be a disc-shaped optical material with a small refractive index of 1.53 around the center and an increasing refractive index up to 1.62 toward the outer circumference, and this is useful as an optical element.

EXAMPLE 10

In this example, a particulate mixture for chalcogenide glass with a composition of 20 mole % of arsenic, 60 mole % of sulfur and 20 mole % of selenium was used as one of the inorganic particles (A), and a particulate mixture for chalcogenide glass with a composition of 20 mole % of arsenic, 30 mole % of sulfur and 50 mole % of selenium as the other inorganic particles (B).

Both mixtures were charged respectively into a mixing device as shown in FIG. 13, and by use of a vacuum pump, the fan for sending air and the fan for mixing were driven and both mixtures were released into the transporting pipe by actuation of the poppets provided in the vessels. The amount of both mixtures released per hour was maintained constant by control of the poppets, and both mixtures were fed into the rotating molding equipment as shown in FIG. 15 while the relative amounts released were being varied. Both mixtures were released in relative amounts, with the total amounts thereof being maintained constant, such that only mixture B was initially released, followed by gradual increase of amount released of the mixture A, until only mixture A was released on completion of molding. Following subsequently the same procedure as in Example 9, a flat disc-shaped molded product was obtained.

This molded product was found to be successively higher in relative existing ratio of selenium from the outer circumference toward the center direction, with the relative existing ratio of sulfur being successively higher from the center toward the outer circumferential direction. The concentration change of selenium was from 20 mole % to 50 mole %, and the concentration change of sulfur from 30 mole % to 60 mole %.

This molded product was sintered according to the heating program as shown below to obtain an optical material.

(1) Molded product placed in a vacuum vessel, which was brought under vacuum state.

(2) Heated at 2° C./min. up to 400° C.
(3) Maintained at 400° C. for 1 hour.
(4) Left to cool.

When the IR refractive index distribution of the optical material obtained in the above steps was measured, it was found to be a disc-shaped optical material with larger refractive index around the center and smaller refractive index toward the outer circumference, and this is useful as an optical element.

EXAMPLE 11

In this example, frit type glass particles with a composition of 5% of $Na_2O$, 10% of $K_2O$, 70% of $SiO_2$ and 15% of PbO were used as one of the inorganic particles and particles of PbO as the other inorganic particles.

Both particles were dispersed respectively in acetone to provide two dispersions, and both dispersions were charged into the respective vessels of a mixing device as shown in FIG. 9. By actuation of the ejecting devices provided at the tip ends of the two feeding pipes, both dispersions were fed into the rotating molding equipment as shown in FIG. 3. The relative ejecting amounts of both dispersions were varied, while the total amount thereof was kept at a constant level, such that only the glass particle dispersion was ejected initially, followed by gradual increase of the ejected amount of the PbO particle dispersion, until the volume ratio of the ejected amounts of the glass particles and PbO particles on completion of molding was made 25:8. During this procedure, acetone which was the dispersing medium was removed from the molding device to obtain a flat disc-shaped molded product.

The molded product was found to be higher successively in relative existing ratio of PbO particles from the bottom toward the upper surface direction, with the glass particles being successively higher in existing ratio from the upper surface toward the bottom direction. The composition ratio was 15% to 36% for PbO.

The molded product was sintered according to the heating program as shown below in a desired calcining furnace while performing degassing operation by a vacuum pump to obtain an optical material.

(1) Heated at a temperature elevation rate of 220 C./min. up to 200° C., while degassing was continued.
(2) Maintained under a degassed state at 200° C. for 10 hours.
(3) Heated at a temperature elevation speed of 2° C./min. up to 500° C., while degassing was continued.
(4) Maintained under the degassed state at 500° C. for 25 hours.
(5) Heated at an temperature elevation rate of 2° C./min. up to 900° C., and degassing continued for one hour.
(6) Maintained under degassed state at 900° C. under pressurization of 120 kg/cm$^2$ for 2 hours.
(7) Application of pressure stopped, and cooled while degassing was continued at a temperature drop rate of 2° C./min. down to 700° C.
(8) Cooled while degassing at a temperature drop rate of 0.1° C./min. from 700° C. to 400° C.
(9) Degassing operation by means of a vacuum pump stopped, and the product left to cool naturally as such in the furnace.

When the refractive index distribution of the optical material obtained in the above steps was measured, it was found to be an optical material having a greater refractive index at the upper surface portion of 1.57 and a smaller refractive index of 1.51 around the bottom, and this is useful as an optical element.

EXAMPLE 12

In this example, a particulate mixture with a composition of 36.0% of $Na_2CO_3$, 6.9% of $K_2CO_3$, 43.5% of $SiO_2$, 43.0% of PbO and 0.6% of $As_2O_3$ was employed as one of the inorganic particles (A), and a particulate mixture with a composition of 7.8% of $Na_2CO_3$, 13.5% of $K_2CO_3$, 60.2% of $SiO_2$ and 18.5% of PbO as the other inorganic particles (B).

While passing a carrier gas through the transporting pipe as shown in FIG. 13, a fan for sending air and a fan for mixing were driven and the poppets provided in the vessels were actuated to release both mixtures into the transporting pipe While the released amounts of both mixtures per hour was controlled constantly both mixtures were fed into the rotating molding equipment as shown in FIG. 14. The relative amounts released of the both mixtures were varied, while the total amount thereof was maintained at a constant level, such that only the mixture A was released initially, then the amount of the mixture A was reduced with subsequent gradual increase of the amount released of the mixture B, until only the mixture B was released on completion of molding. Following subsequently the same procedure as Example 9, a flat disc-shaped molded product was obtained.

The molded product was found to be higher successively in relative existing amount of the mixture from the upper surface toward the bottom direction, with the relative existing ratio of the mixture B being successively higher from the bottom toward the upper surface direction.

The concentrations of the respective components in the molded product were found to vary from the bottom toward the upper surface direction as follows.

$Na_2CO_3$; 5.4% → 5.9%
$K_2CO_3$; 4.9% → 7.8%
$SiO_2$; 70.6% → 79.7%
PbO; 18.8% → 6.6%
$Al_2O_3$; 0.3% → 0%

The molded product was sintered according to the heating program as shown below in a desired calcining furnace while performing degassing operation by means of a vacuum pump to obtain an optical material.

(1) Heated at a temperature elevation rate of 2° C./min. up to 200° C., while degassing was continued.
(2) Maintained under the degassed state at 200° C. for 10 hours.
(3) Heated at a temperature elevation rate of 2° C./min. up to 900° C., while degassing was continued.
(4) Maintained under the degassed state at 900° C. under pressurization of 120 kg/cm$^2$ for 2 hours.
(5) Application of pressure stopped, and cooled at a temperature lowering rate of 2° C./min. down to 450° C. while degassing was continued.
(6) Cooled while degassing at a temperature lowering rate of 0.1° C./min. from 450° C. to 200° C.
(7) Degassing operation by means of a vacuum pump stopped, and the product left to cool naturally as such in the furnace.

When the optical material obtained in the above steps was subjected to measurement of refractive index distribution, it was found to be a disc-shaped optical material with a smaller refractive index of 1.53 around the upper surface and a larger refractive index of 1.62 at the bottom, and this is useful as an optical element.

EXAMPLE 13

Powders of polyvinylidene chloride and polyvinylidene fluoride were used as starting materials. By utilizing the device as shown in FIG. 13, polyvinylidene fluoride powder was charged into one vessel and a powdery mixure of polyvinylidene fluoride and polyvinylidene chloride (mixing ratio 1:2) into the other. While a carrier gas was passed through the transporting pipe, a fan for sending air and a fan for mixing were driven and the poppets provided in the vessels were actuated to release the polyvinylidene fluoride powder and the powdery mixture of polyvinylidene fluoride and polyvinylidene chloride (mixing ratio 1:2), respectively.

During this operation, the poppets were controlled. With the total amount released from the two vessels being controlled at a constant level, only the polyvinylidene fluoride was initially released. Add, after a while, the powdery mixture of the polyvinylidene fluoride and the polyvinylidene chloride was released. The amounts released from the two vessels were gradually varied, until on completion of molding, only the powdery mixture of the polyvinylidene fluoride and the polyvinylidene chloride was discharged. During this procedure, the fan for sending air and the fan for mixing were actuated and the molding equipment shown in FIG. 15 was driven. And the external portion of the molding equipments was brought to reduced pressure by means of an aspirating pump. Finally, a temporary coagulating agent was ejected to complete molding. Thus, a disc-shaped molded product was obtained. This was found to be higher successively in existing ratio of the polyvinylidene fluoride toward the outer circumference direction, with the existing ratio of polyvinylidene chloride being successively higher toward the center direction.

The existing ratio of the polyvinylidene chloride was found to be 0 to 67% from the outer circumference toward the inner side direction.

The molded product was subjected to fusion according to the heating program as shown below in a desired heating furnace while degassing operation was performed by means of a vacuum pump to obtain an optical material.

(1) The product was placed in a furnace and maintained for 30 minutes while degassing was conducted by means of a vacuum pump.

(2) Elevated to 250° C., and maintained under the degassed state for 2 hours.

(3) Under pressurization of 30 kg/cm$^2$, elevated to 265° C. and maintained under the degassed state for 3 hours.

(4) Left to cool naturally.

(5) Returned to atmospheric pressure.

When the organic optical material obtained in the above steps was subjected to measurement of refractory index distribution, it was found to be disc-shaped optical material with greater refractive index at the center and smaller refractive index toward the outer direction, and this is useful as an optical

EXAMPLE 14

Powders of polystyrene and poly-tert-butyl methacrylate were used as the starting materials.

In one of the vessels in the device shown in FIG. 9, a dispersion (A) of a 1:1 mixture of polystyrene and poly-tert-butyl methacrylate was charged, while a dispersion (B) of a 1:4 mixture of polystyrene and poly-tert-butyl methacrylate was charged into the other.

While the total amount ejected of both dispersions was controlled by control of ejecting device, into the molding equipment as shown in FIG. B, only the dispersion (A) was ejected initially followed by gradual decrease of the ejected amount of the dispersion (A) and increase of the ejected amount of the dispersion (B), and finally only the dispersion (B) was ejected. The atmosphere around the filter was brought to a reduced pressure so that the filtration rate of the molding equipment was slightly greater than the feeding rate of the dispersions.

Thus, a disc-shaped molded product was obtained. This was found to be successively higher in existing ratio of polystyrene toward the outer circumference direction, with the existing ratio of poly-tert-butyl methacrylate successively higher toward the center direction.

The existing ratio of polystyrene was found to be from 50% to 20% from the outer circumference toward the center.

The molded product was subjected to fusion while being compressed according to the heating program as shown below in a desired heating furnace to obtain an optical material.

(1) The product placed in the furnace while being maintained horizontal, and maintained for 30 minutes while degassing was performed by means of a vacuum pump.

(2) Elevated to 50° C., and maintained under the degassed state for 1 hour.

(3) Under a pressure of 30 kg/cm$^2$, elevated to 100° C. and maintained under the degassed state for 2 hours.

(4) Left to cool naturally.

(5) Returned to atmospheric pressure.

When the organic optical material obtained in the above step was subjected to measurement of refractive index distribution, it was found to be a disc-shaped optical material with a larger refractive index of 1.53 around the outer circumference and a smaller refractive index of 1.49 around the center, this is useful as an optical element.

EXAMPLE 15

Fine particles of a phenyl methacrylate polymer and fine particles of an isopropyl methacrylate polymer were used as starting materials. Two vessels of the same shape and the same volume were made ready. Into one vessel was charged a butanol suspension of the fine particles of the phenyl methacrylate polymer, and a butanol suspension of the fine particles of the isopropyl methacrylate polymer into the other, in the same volumes, respectively. By use of the device shown in FIG. 2 using a siphon feeding channels were equipped at the two vessels, and a take-out pipe equipped at the vessel containing the butanol suspension of the phenyl methacrylate polymer, thereby permitting the mixture to flow out.

Into the molding equipment as shown in FIG. 3, the above mixture was permitted to flow in. The inflow rate of the mixture was made to coincide with the filtration rate of the solvent.

Thus, a disc-shaped molding product was obtained in the molding equipment. This was found to be successively higher in existing ratio of the phenyl methacrylate polymer toward the bottom portion, with the existing ratio of the isopropyl methacrylate polymer being successively higher toward the upper direction.

The existing ratio of the isopropyl methacrylate polymer was found to be 0 to 100% from the bottom to the upper end portion.

The molded product was subjected to fusion according to the heating program as shown below in a desired heating furnace while degassing operation was performed by means of a vacuum pump to obtain an organic optical material.

(1) Without taking out the molded product from the molding equipment, it was maintained under a horizontal state while degassing was performed by a vacuum pump for 30 minutes.

(2) Elevated to 290° K, and maintained under the degassed state for 2 hours.

(3) Under a pressure of 30 kg/cm$^2$, elevated to 350° K and maintained under the degassed state for hours.

(4) Under a pressure of 45 kg/cm$^2$, elevated to 385° K and maintained under the degassed state for one hour.

(5) Left to cool naturally.

(6) Returned to atmospheric pressure.

When the organic optical material obtained in the steps was subjected to measurement of refractory index distribution, it was found to be a disc-shaped optical material with greater refractive index at the lower end and decreased refractive index toward the upper direction, and this is useful as an optical element.

EXAMPLE 16

Powders of a butyl acrylate-methyl methacrylate (1:1)copolymer (A) and a poly-$\beta$-naphthyl methacrylate (B) were used as the starting material. Into one of the vessels in the device shown in FIG. 13 was charged A, and B into the other. Following subsequently the same procedure as Example 13, a disc-shaped molded product with an existing ratio of 100% of B near the bottom and an existing ratio of each 50% of A and B around the center was obtained.

The molded product was subjected to fusion while being compressed according to the heating program as shown below in a desired heating furnace to obtain an optical material.

(1) The product placed in the furnace while being maintained horizontally, and maintained for 30 minutes while being degassed by means of a vacuum pump.

(2) Elevated to 50° C., and maintained under the degassed state for 1 hour.

(3) Under a pressure of 30 kg/cm$^2$, elevated to 80° C. and maintained under the degassed state for 2 hours.

(4) Left to cool naturally.

(5) Returned to atmospheric pressure.

When the organic optical material obtained in the above steps was subjected to measurement of refractive index distribution, it was found to be a disc-shaped optical material with larger refractive index of 1.63 around the bottom and smaller refractive index of 1.48 at around the upper surface, and this is useful as an optical element.

What we claim is:

1. A process for producing a composite material comprising:

(a) mixing a plurality of different particulate constituents in a fluid to form a mixture, the mixing ratio of the different particulate constituents being varied over a period of time;

(b) feeding the mixture into a central portion of a rotating molding vessel having an interior cavity and filter material aroung the circumference which allows for fluid communication between said interior cavity and the exterior of said molding vessel said feeding step taking place over said period of time to deposit said different particulate constituents in a ratio therebetween varying in the rotation radius direction and in correspondence with the mixing ratio;

(c) applying a sufficient rotational speed to said molding vessel to applying a centrifugal force to said mixture to force the fluid from the particulate constituents and through said filter material;

(d) controlling said rotational speed so as to vary the thickness of said layers; and (e) fixing the deposited particulate constituents.

2. A process for producing a composite material according to claim 1, wherein said fixing includes heat treatment.

3. A process for producing a composite material according to claim 1, including selecting the fluid from the group consisting of a liquid or a gas.

4. A process for producing a composite material according to claim 1, including varying continuously the ratio of at least two of said constituents in the radius direction of said rotation.

5. A process for producing a composite material according to claim 1, including employing a dispersing medium in forming said mixture in addition to said constituents.

6. A process for producing a composite material according to claim 1, including employing as one of the constituents, an inorganic material.

7. A process for producing a composite material according to claim 1, including employing as one of the constituents, an organic material.

8. A process for producing a composite material according to claim 1, including producing as the composite material a sintered product.

9. A process for producing a composite material according to claim 1, including producing as the composite material, an amorphous material.

10. A process for producing a composite material according to claim 1, including producing as the composite material, a crystalline material.

11. A process for producing a composite material according to claim 1, including producing as the composite material, a polymeric material.

12. A process for producing a composite material according to claim 1, including varying linearly and continuously the ratio of the composite material.

13. A process for producing a composite material according to claim 1, including forming the composite material as an optical material having a refractive index varying in at least one direction thereof.

14. A process for producing a composite material according to claim 1, further including causing a pressure difference to force the fluid from the particulate constituents and through said filter material.

* * * * *

UNITED STATES PATENT AND TRADEMARK OFFICE
CERTIFICATE OF CORRECTION

PATENT NO. : 4,798,694
DATED : January 17, 1989
INVENTOR(S) : HIROYUKI SUGATA, ET AL.

It is certified that error appears in the above-identified patent and that said Letters Patent is hereby corrected as shown below:

COLUMN 4

Line 56, "forming device 9." should read
--forming device 10.--.

COLUMN 13

Line 55, "are" should read --as--.

COLUMN 21

Line 32, "in organic particles (A)" should read
--inorganic particles (A)--.

UNITED STATES PATENT AND TRADEMARK OFFICE
CERTIFICATE OF CORRECTION

PATENT NO. : 4,798,694
DATED : January 17, 1989
INVENTOR(S) : HIROYUKI SUGATA, ET AL.     Page 2 of 2

It is certified that error appears in the above-identified patent and that said Letters Patent is hereby corrected as shown below:

COLUMN 23

Line 43, "220" should read --2°--.

COLUMN 25

Line 19, "Add," should read --And,--.

Signed and Sealed this

Twenty-first Day of August, 1990

*Attest:*

HARRY F. MANBECK, JR.

*Attesting Officer*     *Commissioner of Patents and Trademarks*